United States Patent [19]
Bratten

[11] Patent Number: 4,735,730
[45] Date of Patent: Apr. 5, 1988

[54] VACUUM ACTUATED SCRAPER ARRANGEMENT FOR A DRUM FILTER

[76] Inventor: Jack R. Bratten, 5970 St. James Dr., West Bloomfield, Mich. 48033

[21] Appl. No.: 885,401

[22] Filed: Jul. 14, 1986

[51] Int. Cl.⁴ .................. B01D 33/06; B01D 33/36
[52] U.S. Cl. .................. 210/741; 210/791; 210/107; 210/237; 210/354; 210/396; 210/402
[58] Field of Search .......... 210/748, 791, 107, 237, 210/297, 298, 385, 396, 402, 404, 354, 393, 143, 407, 408, 739, 741, 808; 15/256.51

[56] References Cited

U.S. PATENT DOCUMENTS

| | | | |
|---|---|---|---|
| 1,769,655 | 7/1930 | Stehling | 210/297 |
| 2,267,086 | 12/1941 | Donohue | 210/393 |
| 2,876,904 | 3/1959 | Fowler | 210/298 |
| 3,217,882 | 11/1965 | Ogletree | 210/791 |
| 3,840,120 | 10/1974 | Greenberg | 210/298 |
| 4,407,720 | 10/1983 | Bratten | 210/784 |

*Primary Examiner*—Peter Hruskoci
*Assistant Examiner*—Linda Evans

*Attorney, Agent, or Firm*—John R. Benefiel

[57] ABSTRACT

An arrangement for scraping the filtered solids build-up from the surface of a drum filter is disclosed, in which a scraper is mounted with an edge against the surface so that rotation of the drum will accomplish scraping of the surface. Clutching engagement with a rotary drive member is produced by a predetermined extent of axial shifting of the drum against the resistance of a spring bias force. The drum is also arranged to be subjected to an axial pressure force developed by flow through the filter so that clutching engagement is automatically produced upon build-up of solids to a predetermined extent to cause a level of pressure force to be developed to produce a consequent axial shifting sufficient to produce clutching engagement and rotation of the drum. A drag out conveyor moving through the tank engages a rotary sprocket which comprises the rotary drive member, and the scraper edge and drum are positioned to directly deposit the scraped solids on the conveyer to be removed from the tank.

14 Claims, 2 Drawing Sheets

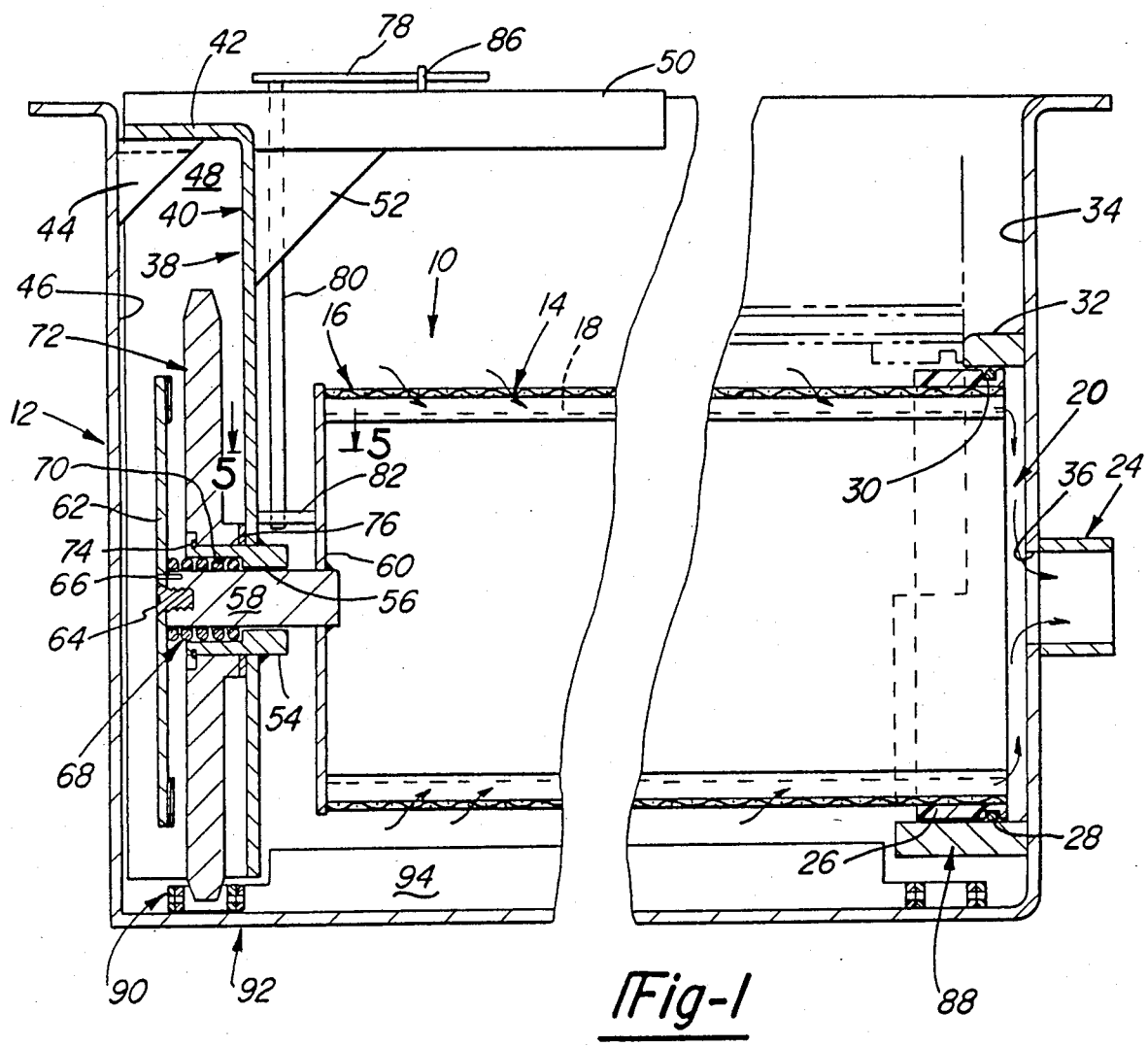
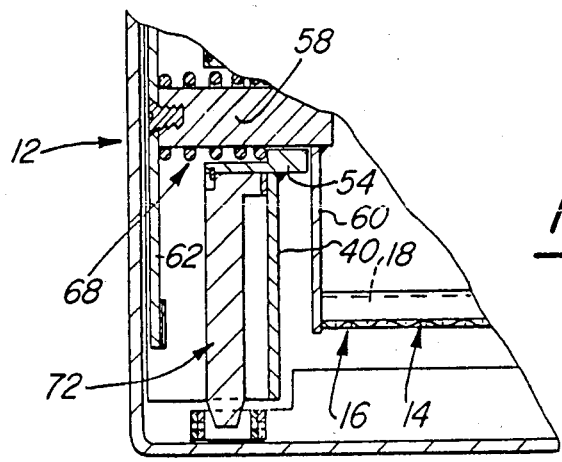

VACUUM ACTUATED SCRAPER ARRANGEMENT FOR A DRUM FILTER

The present invention concerns drum filters of the type having a filter media layer disposed about the drum axis, and more particularly concerns arrangements for periodically cleaning the filter media surface of accumulated solids.

Drum filters are known of the type in which a filtering liquid flow passes through a filter media layer disposed about the axis of a cylindrical drum member. As filtration proceeds, filtered solids accumulate on the surface of the filter media layer. This filter cake acts as a fine filter media, and if the underlying filter media is itself coarse, a certain level of cake build-up is needed for optimum filtering performance.

On the other hand, a greater pressure drop across the media layer will occur as this accumulation process continues, and may proceed to a point where the circulation pump will cavitate and it therefore is usually necessary to periodically clean the filter media.

It is desirable to not remove the filter cake any more often than is necessary for proper flow circulation, since as noted, the cake acts as a fine filter media. While "precoating" of the cleaned filter can be done, i.e., adding solids to the surface of the filter, this adds to the cost of operation and complexity of the filter apparatus.

Various automatically operated scraping and backwashing arrangements are sometimes used to remove the filter cake, as an alternative to manual cleaning of the filter media to avoid shutdown and the labor involved in cleaning the filter, particularly for fully submerged tank filters.

See U.S. Pat. No. 4,407,720 granted to the present inventor which discloses a fully submerged drum filter incorporating a rotary drive for a drum filter, and an arrangement for scraping and backwashing of successive areas of the filter media surface layer.

In order to provide automatic control over the frequency of scraping, sensor devices have heretofore been utilized, to sense the development of excessive pressure drop across the filter media, and to allow activation of the scraping only when excessive built-up has occurred.

See U.S. Pat. No. 4,407,720 cited above for a description of such a system.

However, the use of an electrical pressure sensor to control an electric drive motor is introduced at a considerable cost penalty, due to the inclusion of various necessary control components thereby entailed such as panels, relays, starters, etc. The inclusion of such components also increases the service requirements of the equipment.

Such submerged drum and other filter units are contained in settling tanks, in which the heavier solids or sludge to be removed from a filtered liquid collect, and drag conveyors are often employed to carry out these heavy solids. For equipment using backwashing and scraping, these conveyors are relied on to remove the scraped solids from the tank, after these have settled to the tank bottom as sludge. This requires a significant time interval to allow the sludge to settle out, and a portion of the solids will typically remigrate to the filter surface if the filter is operated during this settling out time interval.

Accordingly, it is an object of the present invention to provide a simple arrangement for a filter scraper which automatically initiates scraping of a drum filter when excessive solids built-up has occurred on the surface of the filter which does not require an electrically operated pressure sensor control device.

It is another object of the present invention to provide a scraping arrangement in which the reintroduction of the sludge into the tank liquid is minimized.

SUMMARY OF THE INVENTION

These and other objects of the present invention are accomplished by providing a clutch arrangement operating to initiate rotation of the drum by a connection to a rotating drive member, the clutch brought into operation by a predetermined level of vacuum developed by the circulation pump drawing liquid through a predetermined solids build-up on the filter. The rotation of the drum causes a scraping action to occur by the action of a scraper blade positioned against the periphery of the drum surface, the scraping action continuing until the pressure drop declines to a level below the predetermined level.

In the preferred embodiment, as the drum is lowered into the settling tank, one end is received within a cradling sleeve segment and is thereafter moved axially into an aligned sealing sleeve by operation of a camming device, to be sealingly fit therein. The sealing sleeve surrounds a pump outlet opening in a sidewall of the tank and filtering flow passes out of the end of the drum to be passed through the pump outlet opening.

A rotary drive sprocket is arranged to be engaged with a drag conveyor drive chain to be constantly rotated by movement of the conveyor through the tank.

The drum is moved axially upon development of a predetermined level of vacuum against the force of a compression spring, to bring a clutch disc into driving engagement with the drive sprocket to be rotated thereby and so to initiate scraping.

The scraper blade, filter drum, and conveyor are relatively positioned adjacent the tank walls so as to cause the scraped solids to be deposited directly within the flights of the drag conveyor to be carried out of the tank, thereby minimizing dispersal of the scraped solids within the liquid contained in the tank.

DESCRIPTION OF THE DRAWINGS

FIG. 1 is a transverse sectional view of a drum filter having a scraping arrangement according to the present invention with the drum filter shown in the installed partially shifted position in a settling tank, the partially shifted position allowing a normal operation of the filter.

FIG. 2 is a fragmentary sectional view of the drum filter shown in FIG. 1 with the drum member in the unshifted position to being shifted by operation of a cam lock mechanism, which unshifted position allows installation and removal of the drum filter.

DETAILED DESCRIPTION

Figure 3:
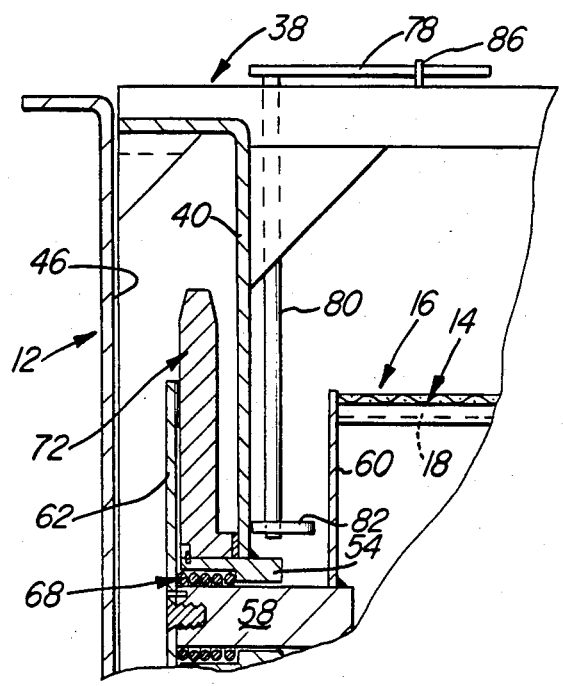
FIG. 3 is a fragmentary sectional view of the drum filter shown in FIG. 1 with the drum member shown in the fully shifted position engaging the clutching arrangement to establish rotary driving of the drum.

In the following detailed description certain specific terminology will be employed for the sake of clarity and a particular embodiment described in accordance with the requirements of 35 USC 112, but it is to be understood that the invention is not intended to be so limited, inasmuch as the invention is capable of taking many forms, and many variations are possible within the scope of the appended claims.

FIG. 1 illustrates a drum filter 10 lowered into a settling tank 12 adapted to receive and contain a liquid to be filtered to remove solid contaminants dispersed therein. Liquid introduced to the tank 12 is adapted to be drawn through a filter media layer 14 disposed about the surface of a generally cylindrical drum member 16 to accomplish the filtering action, with liquid flow passing through axially extending compartments 18 to an end chamber 20 collecting the flow from all of the compartments 18.

Figure 4:
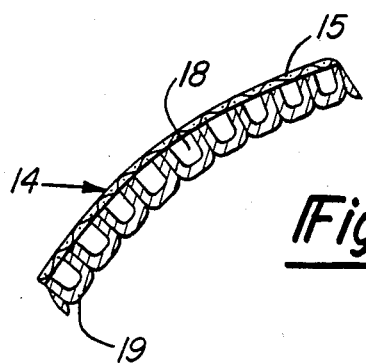
FIG. 4 is a fragmentary view of a section through the periphery of the drum filter.

As seen in FIG. 4, the drum member 16 may be constructed of a circumferential array of U-shaped channels 19 welded together, with the open side thereof facing outwardly. The filter media layer 14 may advantageously be constituted by spaced windings 15 of tapered wire (known in the art as "wedgewire") wound over the channels 19 and welded thereto in the manner well known in the art. Liquid flows through spaces between windings 15 and into compartments 18 to accomplish the filtering action.

The suction side of a circulation pump is adapted to be connected to chamber 20 via fitting 24, to draw liquid from chamber 20.

The drum member 16 carries a bearing ring 26 at one end, formed of suitable bearing material, which ring 26 in turn mounts an O-ring seal 28 disposed in a recess formed in the bearing ring 26.

The bearing ring 26 in turn is slidably and sealingly fit into a sealing sleeve 32 welded to a side wall 34 of the tank 12 surrounding an outlet 36 aligned with fitting 24.

With liquid being pumped from chamber 20, the entire end area of the drum member 16 thus experiences a lowered pressure in compartment 20, which in turn develops an endwise axially directed pressure force tending to shift the drum member 16 within the sleeve 32 towards the outlet 36. This pressure force increases as a greater and greater pressure drop develops across the filter media layer 14 with increasing solids accumulation on the surface thereof.

This pressure force is relied on to cause an automatic clutching of the drum member 16 to a rotary drive member at a predetermined level of solids accumulation, to initiate rotation of the drum member 16 and scraping of the surface of the filter media layer 14 by a scraper to be described hereinafter.

A clutching arrangement for accomplishing this automatic action is located at the opposite end of the drum member 16, the left end as viewed in FIG. 1.

The left end of the drum member 16 is supported on a bracket 38 including a vertically disposed holder plate 40 having a formed horizontal top portion 42 overlying a support 44 welded to tank side wall 46 to be held thereon upon lowering of the drum filter 10 into the tank 12. Stiffening end plates 48 may be secured along either edge of the holder plate 40 and to portion 42 to form an open-ended open bottom box, with the open end facing tank side wall 46.

An elongated lifting handle 50 is welded to the to of portion 42, extending towards the center of drum filter 10 to enable lifting at a single point, with gusset 52 supporting the cantilevered length thereof.

The holder plate 40 mounts a hub 54 passing therethrough and welded in position to be fixed to the holder plate 40. The hub 54 has a bore 56 which slidably receives an axle shaft 58 aligned with the axis of drum member 16 and itself passing through and welded to an end wall 60 welded to the end of the drum member 16.

The drum member 16 is thus supported for rotation about its axis by axle shaft 58 and sealing sleeve 32.

A clutch member comprised of a disc 62 is held with a threaded fastener 64 to the end of axle shaft 58, with one or more drive pins 66 rotatably fixing disc 62 to axle shaft 58 to insure rotation together of these elements.

A leftward bias force is constantly exerted on the drum member 16 in opposition to the pressure force described above. This is created by a compression spring 68 disposed in a counterbore 70 machined into hub 54, compressed between the adjacent face of the clutch disc 62 and the end of counterbore 70, so that the drum member 16 is urged to the left as viewed in FIG. 1, while the pressure force urges the drum member 16 to the right.

A rotary drive member comprised of a sprocket wheel 72 is rotatably mounted on the hub 54 located facing the clutch disc 62, axially located thereon with a snap ring 74 and thrust bearing 76.

The drum member 16 is shown in FIG. 1 in an axially shifted position seated within sleeve 32, which is accomplished by a cam locking means operated by a handle 78 at the end of a handle shaft 80 extending upwardly in tank 12 to be operated from above after lowering of the drum filter 10 into the tank 12.

Figure 5:
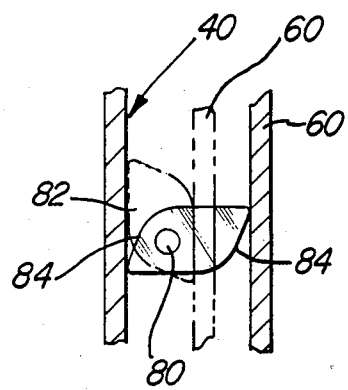
FIG. 5 is a fragmentary view in the direction of the arrows 5—5 in FIG. 1, showing in phantom the cam lock mechanism operated to shift the drum member.

A camming element 82 is affixed at the lower end of handle shaft 80 and located between holder plate 40 and drum end wall 60. Camming element 82 is formed with opposite curved camming surfaces 84 (FIG. 5) which act to force the drum member 16 to the right against the resistance of the spring 68 upon clockwise rotation of handle 78 as viewed in FIG. 5, and lock the same in the fully shifted position, with the handle 78 against stop pin 86.

Thus, the drum filter 10 may be lowered into the tank 12 until the drum member 16 rests on a sleeve segment 88 aligned and extending from lower portion of sealing sleeve 32, as viewed in FIG. 2, and handle 78 thereafter rotated until the drum member 16 is shifted into sealing sleeve 32 sufficiently to be sealed therein.

Additional axial shifting of the drum member 16 may be accommodated by sleeve 32, so that upon development of a predetermined pressure force by sufficient accumulation of filter cake, the resisting force of spring 68 is overcome to bring clutch disc 62 into engagement with sprocket wheel 72 and establish a rotary driving engagement therebetween, as shown in FIG. 3.

Sprocket wheel 72 is rotated by engagement with one of the chains 90 of a drag conveyor 92 mounted for movement through the tank 12, comprised of chains 90 and connected flights 94 welded at intervals between aligned links of chains 90.

Thus, movement of the conveyor 92 through the tank 12 produces rotation of the sprocket wheel 72, rotating clutch disc 62 with the drum member 16 fully shifted by development of a predetermined pressure force, which in turn rotates the drum member 16.

Figure 6:
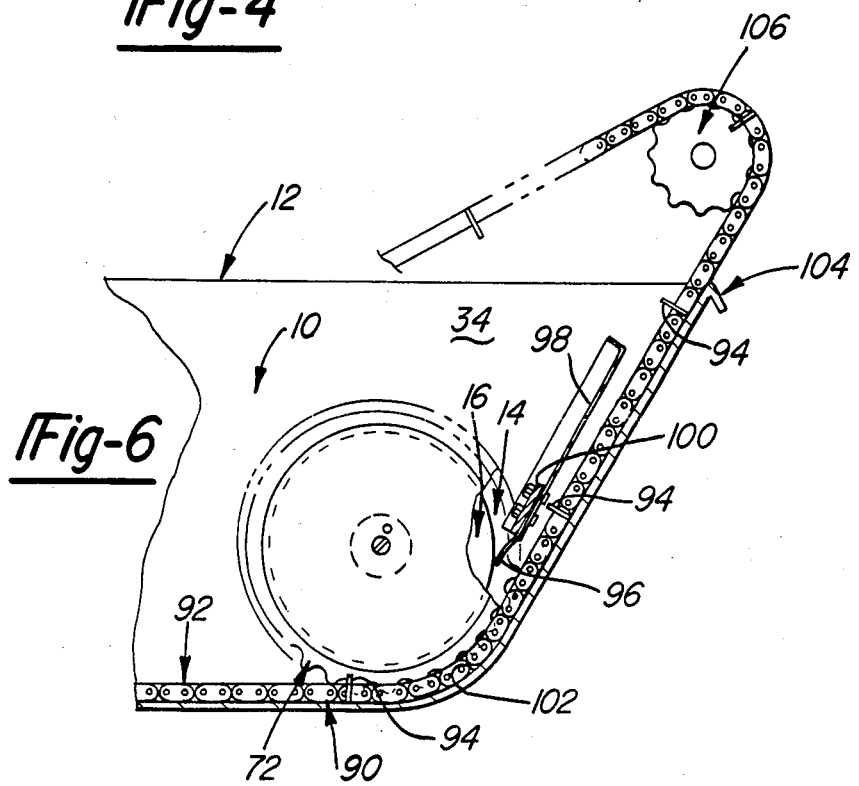
FIG. 6 is a fragmentary endwise view of the drum filter installed in a settling tank, depicting the positional relationship of the scraper blade and the drag conveyor.

Referring to FIG. 6, the arrangement of the drum filter 10 in the tank 12 is shown, in which a spring steel scraper blade 96 is mounted extending parallel to the axis of the drum member 16, with the leading edge thereof in scraping contact with the surface of the filter media layer 14 or a fixed distance away to leave a predetermined depth of accumulated solids on the filter surface.

A scraper baffle plate 98 is affixed to opposite tank side walls 34 and 46, and provide mounting for a scraper blade clamping bar 100.

The drum filter 10 is mounted concentric to a curved tank bottom and side section 102, with sprocket wheel 72 acting to guide one of the conveyor chains 90 therearound. The position of the scraper blade 96 is such that scraped solids are directly deposited onto the flights 94 of the drag conveyor 92 rather than being dispersed into the tank liquid, and are thus directly carried out of the tank 12. The position of the drum filter 10 and baffle plate 98 act to confine the dispersal of sludge, and therefor also contribute to this purpose.

Upon reaching the lip 104, the sludge passes out of the tank 12 and is collected by a suitable collection and disposal apparatus (not shown). The drag conveyor 92 is driven as by drive sprocket 106, and recirculated into the tank 12 by suitable further sprockets, not shown. Thus the sludge is prevented from again being dispersed in the tank to minimize redeposit on the filter media layer 14.

Accordingly, it can be appreciated that a simple mechanical automatic control of the scraping cleaning of the drum filter has been provided by the pressure operated clutching engagement described.

The elimination of an electrical sensor and electrical controls for starting and stopping a drive motor greatly lessens the cost of manufacturing this equipment.

What is claimed is:

1. A filter having an automatically actuated scraping arrangement comprising a drum filter disposed in a liquid receiving tank, said drum filter including a filter media layer extending around an axis to form a drum member, circulation means for drawing liquid in said tank through said filter media layer and out through means defining an outlet passage, said scraping arrangement comprising:
   means mounting said drum member for rotation about its axis;
   a scraper blade mounted to scrape away solids deposited on the surface of said filter media layer as said drum member rotates;
   a rotating drive member;
   clutching means acting when actuated to establish a rotary driving connection between said drive member and said drum member, including a clutch member carried by said drum member shiftable from an idle position to a position engaging said rotary drive member; and
   actuation means responsive to the development of a predetermined pressure drop across said filter media layer generating a pressure force acting on said drum member to cause shifting of said drum member by said pressure force acting thereon to carry said clutch member to said engagement position, to thereby cause rotation of said drum member and scraping away of solids on said drum filter media layer surface.

2. The filter according to claim 1 further including a sleeve affixed to the inside of said tank, and wherein said drum member is adapted to have one end thereof slidably received in said sleeve and sealingly rotatable therein, said circulation means drawing liquid from within said sleeve to generate a vacuum tending to axially move said drum within said sleeve and thereby cause engagement of said clutch member with said drive member.

3. The filter according to claim 2 further including spring bias means opposing said axial movement of said drum member whereby said shifting of said clutch member occurs only upon development of a predetermined pressure force sufficient to overcome said spring bias means.

4. The filter according to claim 3 further including an end wall closing off the opposite end of said drum member and a hub shaft affixed to said end wall extending from said opposite end of said drum member, said hub shaft aligned with the axis of said drum member, and wherein said clutch member comprises a clutch disc affixed to said hub shaft.

5. The filter according to claim 4 further including a hub sleeve supported within said tank and rotatably receiving said hub shaft, and wherein said spring bias means comprises a compression spring seated on said hub sleeve at one end and against said clutch disc at the other end.

6. The filter according to claim 5 further including a sleeve segment extending from one end of the lower portion of said sleeve, adapted to receive said one end of said drum member and position said drum member for axial movement into said sleeve.

7. The filter according to claim 6 further including a support bracket having said hub sleeve affixed thereto and adapted to be supported within said tank upon lowering of said drum member into said tank with said one end received within said sleeve segment.

8. The filter according to claim 7 further including a cam lock means having a handle mounted on said support bracket to extend upwardly in said tank and having a cam lock element affixed to the lower end of said cam lock handle to be movable therewith, said cam lock element located to force said drum towards said sleeve against the action of said spring bias means upon predetermined movement of said cam lock handle, whereby said drum may be seated within said sleeve upon movement of said cam lock handle.

9. The filter according to claim 1 further including a drag out chain conveyor driven within said tank for movement past said drum member, and wherein said drive member is engaged with said conveyor to be rotated by movement of said conveyor past said drive member.

10. A method of removing accumulated solids from the surface of a vacuum drum filter of the type having a drum member disposed in a liquid receiving tank with a filter media layer extending about the axis of said drum member and receiving a filtering flow of liquid therethrough comprising the steps of:
   positioning a scraper edge with respect to the drum member surface so as to scrape said accumulated solids therefrom upon rotation of said drum member;
   rotatably mounting said drum member within said tank to be axially shiftable therein;
   subjecting said drum member to a pressure force corresponding to the pressure drop across said filter media layer acting to shift said drum member axially to a predetermined extent only upon development of a predetermined pressure drop level; and establishing a clutching engagement of said drum member with a rotating drive member upon shifting movement of said drum member in said tank upon development of said predetermined level of pressure drop across said filter media layer, thereby initiating rotation of said drum member and scraping of said accumulated solids upon development of said predetermined pressure drop.

11. The method according to claim 10 wherein said filter includes a drag conveyor movable through said tank and further including the step of positioning said rotating drive member to be rotated by said drag conveyor movement.

12. The method according to claim 10 further including the step of lowering said drum member into said tank to be aligned with a sleeve affixed to a side wall of said tank, and axially displacing said tank member to slide one end of said drum member into said sleeve to be sealingly fit thereinto, and drawing liquid out of said tank through an opening in said tank within said sleeve, whereby a pressure force is generated acting on said drum member tending to shift said drum member further into said sleeve.

13. The method according to claim 12 wherein during shifting of said drum member into said sleeve, a bias force is constantly exerted resisting said shifting of said drum member, whereby said pressure force must reach a predetermined level in order to overcome said bias force and shift said drum member.

14. The method according to claim 13 wherein said drum member is locked in an axially shifted position moved into said sleeve to a predetermined extent, whereat said clutching engagement with said drive member has not occurred, whereby further axial shifting of said drum member is required to produce said axial shifting.

* * * * *

UNITED STATES PATENT AND TRADEMARK OFFICE
CERTIFICATE OF CORRECTION

PATENT NO. : 4,735,730

DATED : April 5, 1988

INVENTOR(S) : Jack R. Bratten

It is certified that error appears in the above-identified patent and that said Letters Patent is hereby corrected as shown below:

Column 2, line 54, "position to" should be --position prior to--.

Column 4, line 1, "to" (second occurrence) should be --top--.

Signed and Sealed this

Sixteenth Day of August, 1988

Attest:

DONALD J. QUIGG

Attesting Officer

Commissioner of Patents and Trademarks